Patented Dec. 8, 1931

1,835,911

UNITED STATES PATENT OFFICE

WALTER O. SNELLING AND JOSEPH A. WYLER, OF ALLENTOWN, PENNSYLVANIA, ASSIGNORS TO TROJAN POWDER COMPANY, OF NEW YORK, N. Y., A CORPORATION OF NEW YORK

STABILIZATION OF NITROSTARCH

No Drawing. Application filed March 23, 1926. Serial No. 96,872.

The principal object of this invention is to provide a novel and advantageous method for stabilizing nitrostarch, and the invention contemplates the provision of nitrostarch of relatively high stability and having certain desirable characteristics not found to the same extent in nitrostarch stabilized by prior methods. A further object is to increase the safety of manufacturing nitrostarch explosives.

We have discovered that pyridine, contrary to the prevalent belief, exerts a marked and distinctive stabilizing effect upon nitrostarch. We have found not only that nitrostarch properly treated with pyridine shows a distinctly improved resistance to deterioration due to adverse climatic and other conditions, but also that the pyridine largely reduces or completely eliminates the normal tendency of nitrostarch to explode or ignite when subjected to relatively high temperatures, such for example as 100° C., for predetermined lengths of time. The stabilizing influence of pyridine accordingly increases the safety of handling nitrostarch throughout the various operations of making a finished explosive, and also imparts a greater stability to the finished explosive made therefrom.

Although the procedure in practicing this invention may vary largely, we may in a representative case make up a solution in water of pyridine containing approximately .5% of the latter, and to about 300 parts of this solution add approximately 100 parts of wet nitrostarch containing about 30% water. This mixture is stirred for about one hour at ordinary temperatures, after which it is filtered, washed with cold water, and dried in a current of air at about 50° C. This dried nitrostarch constitutes the stabilized product.

The stabilization afforded is marked in that the nitrostarch treated with pyridine gives only a small loss in weight under given conditions of temperature and pressure per unit of time, as compared with ordinary untreated nitrostarch. Also the stabilization is distinctive in that the pyridine-treated nitrostarch, although gradually losing weight by decomposition, does not ignite or detonate at 100° C., even after comparatively prolonged heating at this temperature, thus providing a product which may be dried safely at elevated temperature.

We have further discovered that pyridine as a stabilizer for nitrostarch has an even more marked stabilizing effect when used in conjunction with certain other compounds, and further that with or without the pyridine, these other compounds, having only a relatively slight stabilizing effect when used alone, have, when used in multiple or simultaneously, a materially greater stabilizing effect.

As an example of our procedure in this instance, we may place 300 parts of water solution containing .2% ammonia, .1% monomethylamine, and .1% pyridine in a suitable agitating vessel, and add to this about 100 parts of wet nitrostarch containing about 30% of water. This mixture is stirred for about an hour, filtered, washed with cold water, and dried at 50° C. in a current of air, producing the stabilized product.

In another and preferred instance, substantially the same procedure may be used employing a dilute solution of ammonia and pyridine alone, the content of ammonia being about .25% and the content of pyridine about .25%.

In general, any two or more of a relatively large number of volatile, water-soluble agents may be used to advantage in the practice of this invention. As examples of these agents, we may name the following:

1. Ammonia, the compound.
2. Derivatives of ammonia in which one or more hydrogen atoms are replaced by one or more aliphatic or aromatic radicals, such for example as monomethylamine, dimethylamine, etc.
3. Heterocyclic six-membered compounds of the general formula $C_nH_{2n-5}N$ and their derivatives, as for example pyridine, picoline, piperidine, etc.
4. Compounds formed by the condensation of a benzene nucleus with a heterocyclic six-membered ring, as for example, quinoline.

Any two or more of the above substances used simultaneously have a marked effect towards stabilizing nitrostarch materially exceeding the effect obtainable by any one of the substances used alone.

It will be understood that the specific procedure outlined above may vary considerably without departing from the invention, although that outlined will afford an index to the successful practice of the invention.

We claim:

1. The method of stabilizing nitrostarch, which consists in treating said nitrostarch with pyridine in small amount.

2. The method of stabilizing nitrostarch, which consists in treating said nitrostarch with a dilute solution of pyridine in a neutral solvent.

3. The method of stabilizing nitrostarch, which consists in treating said nitrostarch with a dilute water solution of pyridine.

4. The method of stabilizing nitrostarch, which consists in treating said nitrostarch with a solution of pyridine in a neutral solvent, containing approximately 0.5% of pyridine.

5. The method of stabilizing nitrostarch, which consists in forming a dilute solution of pyridine in a neutral solvent, adding thereto a quantity of nitrostarch, agitating the mixture, and filtering to collect the stabilized product.

6. An explosive comprising nitrostarch stabilized with pyridine.

7. An explosive comprising pyridine-treated nitrostarch.

8. The method of stabilizing nitrostarch, which consists in treating said nitrostarch simultaneously with a plurality of neutralizing agents one of which is pyridine in a low degree of concentration.

9. The method of stabilizing nitrostarch, which consists in treating said nitrostarch with a dilute water solution of a plurality of stabilizing agents one of which is pyridine.

10. The method of stabilizing nitrostarch, which consists in treating said nitrostarch simultaneously with ammonia and pyridine, the pyridine being in a low degree of concentration.

11. The method of stabilizing nitrostarch, which consists in treating said nitrostarch with a dilute solution in a neutral solvent contaning ammonia and pyridine.

12. The method of stabilizing nitrostarch, which consists in treating said nitrostarch with a dilute solution in water of ammonia and pyridine.

13. The method of stabilizing nitrostarch, which consists in treating said nitrostarch with solution in neutral solvent of ammonia and pyridine, the content of ammonia being approximately .25% and of pyridine .25%.

14. An explosive comprising nitrostarch stabilized with both ammonia and pyridine.

15. The method of stabilizing nitrostarch, which consists in treating said nitrostarch simultaneously with small amounts of a plurality of stabilizing agents of which one is ammonia, and the other a heterocyclic six-membered compound of the general formula $C_nH_{2n-5}N$.

WALTER O. SNELLING.
JOSEPH A. WYLER.